United States Patent [19]

Funamoto

[11] Patent Number: 5,171,195
[45] Date of Patent: Dec. 15, 1992

[54] MINIATURE REDUCTION GEAR

[75] Inventor: Tatsuaki Funamoto, Suwa, Japan

[73] Assignee: Seiko Epson Corporation, Tokyo, Japan

[21] Appl. No.: 613,755

[22] PCT Filed: Feb. 21, 1990

[86] PCT No.: PCT/JP90/00205

§ 371 Date: Dec. 21, 1991

§ 102(e) Date: Dec. 21, 1991

[30] Foreign Application Priority Data

Feb. 22, 1989 [JP] Japan ................................. 1-42713
Dec. 26, 1989 [JP] Japan ................................. 2-337601

[51] Int. Cl.5 ............................................. F16H 1/32
[52] U.S. Cl. .................... 475/342; 74/DIG. 10; 74/606 R; 475/318; 475/265; 475/902
[58] Field of Search .............. 74/606 R, DIG. 10; 475/263, 264, 265, 318, 342, 902

[56] References Cited

U.S. PATENT DOCUMENTS

| | | | |
|---|---|---|---|
| 1,040,867 | 10/1912 | Bradley | 475/263 R |
| 1,723,327 | 8/1929 | Bronander | 475/263 |
| 1,815,345 | 7/1931 | Colman | 475/263 X |
| 2,001,036 | 5/1935 | Prince | 475/265 X |
| 2,053,130 | 9/1936 | Cheyne | 475/342 X |
| 2,558,840 | 7/1951 | Gordon | 475/318 X |
| 3,081,648 | 3/1963 | Duer | 475/342 X |
| 4,433,964 | 2/1984 | Holtzberg et al. | 74/DIG. 10 X |
| 4,494,414 | 1/1985 | Hamano | 475/263 X |
| 4,662,477 | 5/1987 | Minoru | 185/45 |
| 4,848,172 | 7/1989 | Morishita | 74/7 E |

Primary Examiner—Allan D. Herrmann
Attorney, Agent, or Firm—Blum Kaplan

[57] ABSTRACT

A miniature reduction gear includes a sun gear, a fixed inner gear and a movable inner gear and at least one planetary gear. The planetary gear is formed of three stages of outer teeth. Each outer tooth stage separately engages one of a sun gear, fixed inner gear and movable inner gear. The sun gear provides an input to the miniature reduction gear and the movable inner gear provides an output. The number of teeth of the planetary gear which engage with the sun gear is greater than the number of teeth which engage with either of the fixed inner gear or movable inner gear.

15 Claims, 5 Drawing Sheets

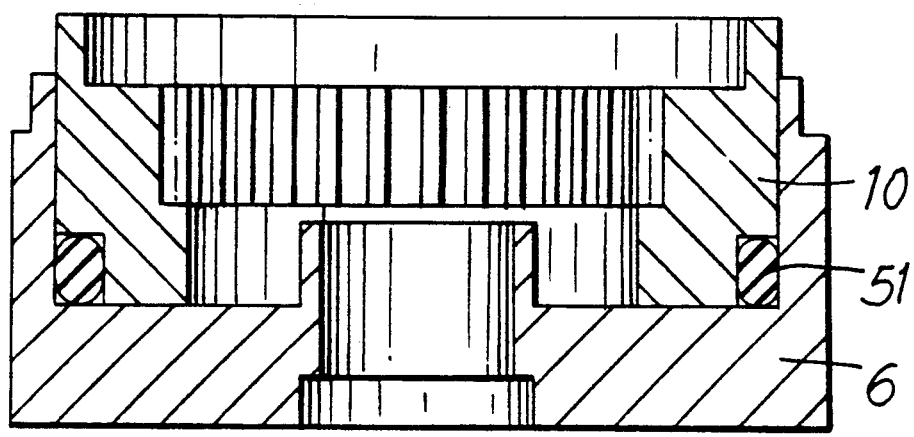
FIG.5
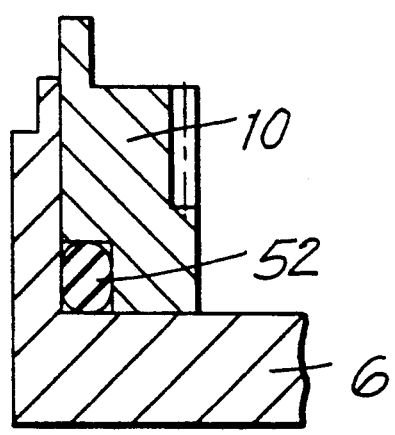
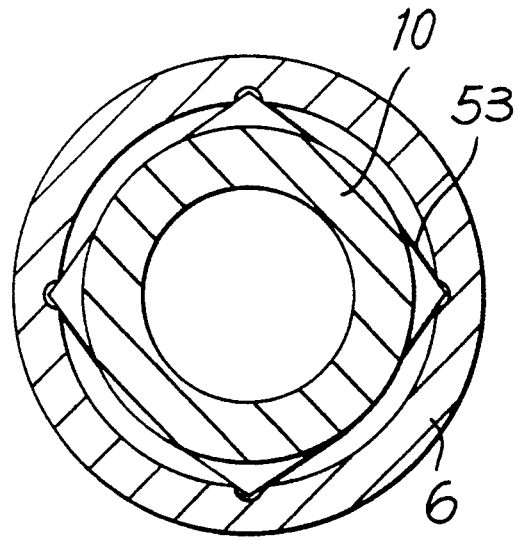
FIG.6(a)   FIG.6(b)

MINIATURE REDUCTION GEAR

BACKGROUND OF THE INVENTION

The present invention relates to a reduction gear directly joined to a motor, and more particularly is one that relates to the reduction mechanism of a miniature reduction gear of 50 mm maximum diameter that is directly joined to a miniature motor.

FIG. 8 shows an example of a prior miniature reduction gear of this type that uses planetary gears.

In FIG. 8, motor shaft gear 103 is wedged into motor shaft 102 that is in the center of miniature motor 101. Lower case 104 is installed by screw fastening to miniature motor 101 with motor shaft 102 as the central axis. Inner teeth 105 are attached to lower case 104, and there are 2 to 4 planetary gears 106 between them and motor shaft gear 103. Motor shaft gear 103 engages on the inside of plural planetary gears 106, and inner teeth 105 engage on the outside. The centers of plural planetary gears 106 are connected by holder main body 107, and output shaft gear 109 is in the center of holder main body 107. Intermediate cradle 108 is connected to lower case 104, and serves as the bearing for output shaft gear part 109. Output shaft gear 109 engages with planetary gears 106, and planetary gears 106 engage with inner teeth 105. In this manner, the gear that is in the center serves as the motive power, and when we take up to when it rotates holder main body 107 by means of planetary gears 106 as one set, the mechanism repeats the set in any number of stages when the reduction ratio is large. In the final stage of repeating this set, output shaft 110 is in the rotational center of holder main body 107.

Also as shown in FIG. 9, prior miniature reduction gears having a sliding function or a one-way clutch function furnish a sliding mechanism or one-way clutch mechanism on output shaft 110 of miniature reduction gear 121, and transmission is done by transmission gear 123 which is on the said sliding mechanism or one-way clutch mechanism 122.

With such miniature reduction gears using planetary gear mechanisms following the prior constructions shown in FIG. 8 and FIG. 9, the reduction proceeded with holder main body 107 from motor shaft gear 103 via planetary gears 106, but one group of reduction ratios from motor shaft gear 103 to holder main body 107 was small, so it was necessary to have many groups of gears in order to obtain a larger reduction ratio. Because of this, there were problems of cost increases, noise and backlash.

The present invention is one that resolves such prior problems, and its object lies in offering a miniature reduction gear of high transmission efficiency having a miniaturized weight mechanism that takes a sun gear as input and a movable inner gear as output.

SUMMARY OF THE INVENTION

A miniature reduction gear includes a sun gear, a fixed inner gear, a movable inner gear and at least one planetary gear. The planetary gear is formed with three stages of outer teeth that act separately to engage with the sun gear, fixed inner gear and movable inner gear respectively in a reduction mechanism. The sun gear provides an input and the movable inner gear provides an output. The number of planetary gear teeth which engage with the sun gear is greater than the number of teeth which engage with either the fixed inner gear or the movable inner gear.

The planetary gear mechanism of miniature reduction gear of the present invention is supported within a housing and has a sliding function or one-way clutch function, the invention is characterized in having the sliding mechanism or one-way clutch mechanism between the fixed inner gear and the housing.

BRIEF DESCRIPTION OF THE DRAWINGS

FIG. 5 is a sectional view showing another example of the present invention.

FIGS. 6(a), 6(b) are representational drawings of a sliding mechanism used in the other example of the present invention.

DESCRIPTION OF THE PREFERRED EMBODIMENTS

Figure 1:
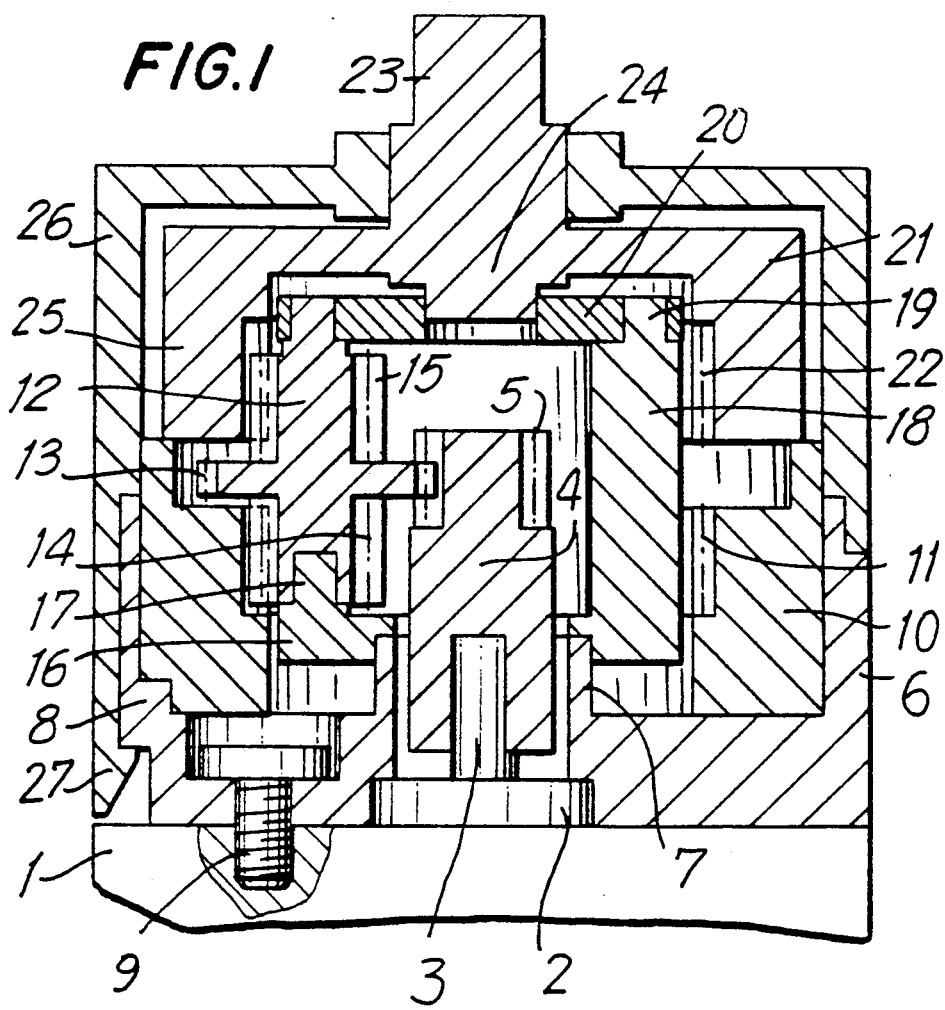
FIG. 1 is a sectional view showing an example of the present invention.

The invention will next be explained with reference to the attached drawings, in order to describe it in further detail. FIG. 1 shows an example of the present invention, wherein motor boss 2 and motor shaft 3 are present on the central axis of miniature motor 1, and sun gear 4 is wedged into motor shaft 3. Also present as parts whose central axes are the same as the central axis of motor shaft 3 are sun gear 4, lower case 6, fixed inner gear 10, holder main body 16, holder cap 20, movable inner gear 21 and upper case 26. Lower case 6 is positioned by motor boss 2 and fastened by attachment screw 9. Fixed inner gear 10 is attached to lower case 6 by rotation stop shaped part 8. The rotation stop shape may be a tooth shape or any unevenness furnished respectively in lower case 6 and fixed inner gear 10. Although lower case 6 and fixed inner gear 10 may be in one body, for more miniaturization they should be separate bodies because attachment screw 9 and the tooth shapes of fixed inner gear 10 get in the way and become problems during assembly.

Two to four planetary gears 12 are arranged in point symmetry with solar gear 4 and engage with it, and also engage with fixed inner gear 10 and movable inner gear 21. The center shafts of planetary gears 12 are retained by holder main body 16 and holder caps 20 so that they are retained constantly parallel with the central shaft of solar gear 4. The shafts on the top and bottom of the planetary gears are both supported on their ends in the shaft bearings of holder main body 16 and holder caps 20. Holder main body 16 is composed of planetary gear support stands 17 as bearing for one of the ends of planetary gears 12, support column 18 that remains holder caps 20, and guide shaft 19 that fixes holder caps 20 in position. Planetary gears 12 are assembled in holder main body 16, and the unit fixed by holder caps 20 becomes the planetary gear unit. The planetary gear unit is supported at both ends, the upper end by holder cap receiver 24 and the lower end by holder support stand 7, and rotates around the central shaft of sun gear 4. Further, when the planetary unit is a structure that supports planetary gears, errors in assembly can be eliminated by adopting a construction wherein one shaft of a planetary gear 12 is a tenon and the other a hole. Or when it is formed as one body from plastic, holes can serve for closing in order to obtain high accuracy, without any restriction imposed by the present example.

Figure 3:
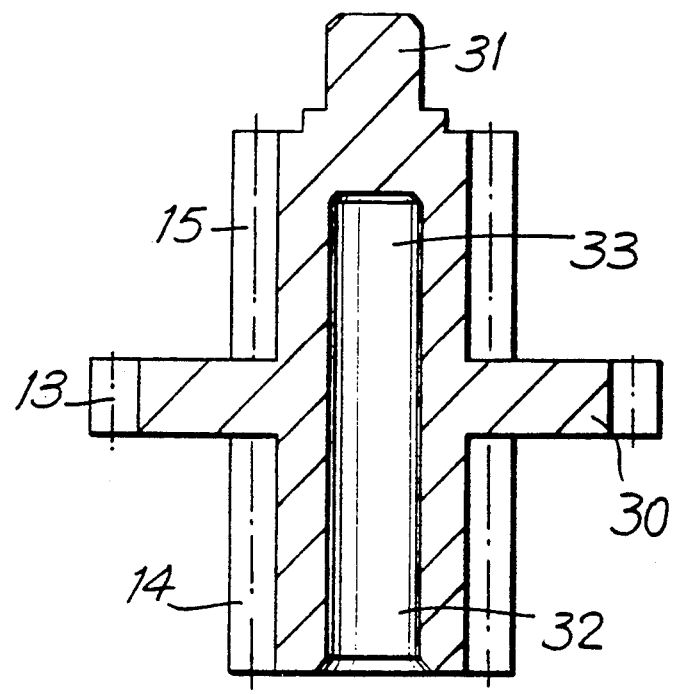
FIG. 3 is a sectional view showing an example of a planetary gear used in the miniature reduction gear of the present invention.

Planetary gear 12 is cross-shaped in section as shown in FIG. 3 and has tooth shape forming arms 30 and a central shaft part with tenon 31. This central shaft furnishes blind closed hole 32 in the axial longitudinal direction and has tooth form part 14 engaging with the fixed inner gear and tooth form part 15 engaging with movable inner gear 21 on its two end portions. Tooth forms 13 that engage with solar gear 4 are on both surfaces of tooth form forming arms 30.

The tooth shaped parts of planetary gear 12 are comprised of tooth form part 13 of the planetary gear, tooth form part 14 of the planetary gear and tooth form part 15 of the planetary gear. Planetary gear tooth part 13 engages with tooth part 5 of sun gear 4, planetary gear tooth part 14 engages with tooth part 11 of fixed inner gear 10, and planetary gear tooth part 15 engages with tooth part 22 of movable gear 21. There are no fixed rules for the shapes of the planetary gears or the positional relations among planetary gear tooth shape 13, planetary gear tooth part 14 and planetary gear tooth part 15. However, when planetary gear tooth part 13 that engages in tooth part 5 of sun gear 4 is between planetary gear tooth part 14 and planetary gear tooth part 15 as shown in FIG. 3, assembly is better and there is better use of space because the diameter of planetary gear tooth part 13 is larger than the others. Also, when using plastic to form planetary gear 12, higher precision is obtained by making one of the central shafts tenon 31 and the other hole 32, and also by furnishing closed hole 33 in the deeper part of hole 32. Further, when the thickness of planetary gear tooth part 13, the diameters of hole 32 and closing 33 and the depth of hole 32 and closing 33 are set so that the thicknesses are uniform in the range of 0.5 mm to 2 mm, still higher accuracy will be obtained as well as higher efficiency and lower noise.

Movable inner gear 21 is constructed of movable inner gear tooth part 22, output shaft 23 in the center and peripheral part 25 on its outside. The upper end of output shaft 23 is supported by upper case 26 and the lower end of peripheral part 25 is supported by lower case 6, and it rotates around the central shaft of solar gear 4. Upper case 26 has hook 27, it is hook-fastened to lower case 6 with this hook 27. Because it also does service as the shaft bearing of output shaft 23, it is formed as one body of plastic having sliding properties, and plays the role of a housing for the entire miniature reducing gear. The method of attaching upper case 26 and lower case 6 may be any kind of screw fastening in addition to the hook described, but by following the present example the space required to attach upper case 26 and lower case 6 is minimized to obtain a more miniaturized reducing gear.

Figure 4:
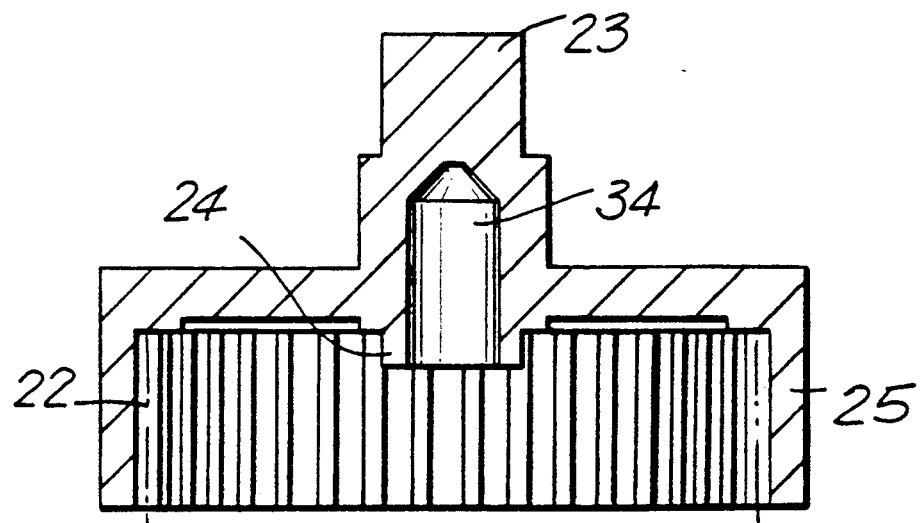
FIG. 4 is a sectional view showing an example of an output shaft embodied in a movable internal gear used in the miniature reduction gear of the present invention.

FIG. 4 shows movable inner gear 21. Movable inner gear 21 has its inner surface formed in the shape of a cylindrical vessel with movable gear teeth 22 engaging with the planetary gear on the inner diametric surface, and has output shaft 23 in the central part of the unopened surface side of this vessel element.

There is no need for movable inner gear 21 and output shaft 23 to be formed as one body, but when movable inner gear 21 and output shaft 23 are formed as one body using plastic having sliding properties as shown in FIG. 4, the following effect is obtained.

Prior movable inner gear 21 and output shaft 23 were separate bodies, and when output shaft 23 was metal the parts were costly because of such as machining with double D cuts. It was also necessary to have subassembly of movable inner gear 21 and output shaft 23, which lead to decreased reliability. On the other hand, costs are reduced and reliability increased by forming movable inner gear 21 and output shaft 23 as a single body. Further, providing holder cap cradle 24 as one body stabilizes the rotation of the planetary unit at no increase in cost, and gives higher efficiency and lower noise. Still greater precision can be obtained by forming this part with a uniform thickness in the range of 0.5 mm to 2 mm, although this will vary depending on the overall size of the miniature reduction gear, and by furnishing closing 34 in the central part of output shaft 23 and holder cap cradle 24 as required.

The plastic that forms movable gear 21 as one body may be something that is suitable for strength under output torque, suitable plastics being those with carbon fiber or whiskers blended in suitable amounts into polyacetal resin or polyamide resin, because their bending strengths are greater than 2,000 kilograms per square centimeter. Further, these resin materials will be used in fixed inner gear 10 and planetary gear 12 as well as in movable inner gear 21.

In this miniature reduction gear, parts that are formed as single bodies with plastic having sliding properties are lower case 6, holder main body 16, holder cap 20 and upper case 26. The plastic materials to be used in these parts are polyacetal resin, polyamide resin and polyester resin given blends of such as carbon fiber, whiskers, glass fiber and mica in suitable amounts, these being suitable because of satisfactory strength and a coefficient of friction lower than 0.2.

Polyamide type plastics containing filler or whiskers and lubricant are particularly suitable for use because of their high strength and low coefficient of friction. When the filler or whisker content is 20 to 40% and the lubricant content is 5 to 20%, the bending strength will be 2,800 kilograms per square centimeter and the coefficient of expansion will be on the order of 0.1, so that their use in the gears and holders will give miniature reducing gear of particular high resistance to torque and high efficiency.

Although plastic is suitable as a material for the parts above, the use of other materials will affect the superiority of the present structure.

Planetary gear tooth part 13 has number of teeth t, tooth part 14 has number of teeth r and tooth part 15 has number of teeth s, and their modules or phases will vary depending of the engagements with toothed part 5 of sun gear 4, toothed part 11 of fixed inner gear 10 and toothed part 22 of movable inner gear 21.

Consequently, when sun gear 4 rotates, planetary gears 12 begin self-rotation and solar rotation because fixed inner gear 10 does not move. When we take the number of teeth of toothed part 5 of sun gear 4 as being l and the number of teeth of toothed part 11 of fixed inner gaer 10 as being m, then the solar rotation of planetary gear 12 will be one rotation in the portion $(1+(t\times m)/(r\times l))$ relative to one rotation of sun gear 4. Also when the number of teeth of toothed part 22 of movable inner gear 21 is n, then the rotation of movable inner gear 21 will be one in the portion $(1/(1-(s\times m)/(r\times n))$ relative to one solar rotation of planetary gear 12.

*Reduction ratio* $=(1+(t\times m)/(r\times l))/(1/(1-(s\times m)/(r\times n))$

This illustrates the fact that it is possible to adopt many reduction ratios for the miniature planetary reduction mechanism. There are instances where there will be negative values in the above, when output shaft 23 is in reverse rotation relative to sun gear 4.

Also, the output torque increases relative to the input torque in proportion to the increase in the reduction ratio.

*Output torque = input torque × |reduction ratio| × transmission efficiency*

In this manner, the rotation of solar gear 4 transmits a torque that increases with rotation and is reduced by movable inner gear 21 and output to output shaft 23.

Figure 2:
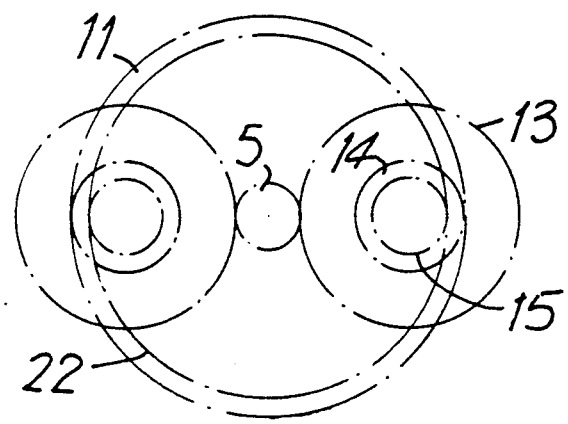
FIG. 2 is a plan view showing an example of the present invention.

FIG. 2 shows a plan view of the present example. Although two planetary gears are shown in FIG. 2, theoretically one would do as well, but 2 to 4 are needed in consideration of balance of strength, so 3 is the most preferred. However, the the number of planetary gears is not restricted by the above equations as to the number of teeth on each gear.

In this manner, a large reduction ratio is achieved by assembling a small number of gears, so that there is little decrease in transmission efficiency because of engaging, and transmission efficiency is high from input to output. As a result, it is possible to create a large torque in output shaft 23.

This shows that the peripheral part of output shaft 23 has the strength to withstand a large torque without sticking, so that the planetary gear mechanism of the present invention is fundamentally of a construction that will withstand a large torque. That is, when the output shaft torque transposes to toothed part 22 of the movable inner gear, since there is a large diameter from the center, the force received at the toothed part is small. Also when there are plural planetary gears 12, the force exerted on the gears is distributed in accordance with the number of planetary gears 12. Further in regard to the engagement ratio, while that in the outer teeth is 1 to 1.5, the engagement of toothed part 22 of the movable inner gear with toothed part 15 of the planetary gears and the engagement of toothed part 14 of the planetary gears with toothed part 11 of the fixed inner gear is larger at 2 to 3. Because of this, the load received per one tooth of movable inner gear toothed part 22, planetary gear toothed parts 15, planetary gear toothed parts 14 and fixed inner gear toothed part 11 may be small, but in the last analysis a torque is achieved that is 10 to 20 fold higher than conventional reduction gears having the same order of size but engaging only the outer gear. Using a high strength plastic in addition to the above will give high reliability and lower cost.

Also, the planetary gears are 3-stage, so the relation of planetary gear toothed part 13 with number of teeth t engaging with sun gear 4 to planetary gear toothed part 14 having number of teeth r engaging with fixed inner gear 10 and with planetary toothed part 15 having number of teeth s engaging with movable gear 21 is $t > r$ or $t > s$. Because of this, the solar rotation speed of the planetary gears can be suppressed to the lowest limit, and consequently it is possible to have low noise and high efficiency. Use of plastic with a low coefficient of friction gives still more decrease in noise and increase in efficiency.

Further, there is little backlash because it is possible to achieve a high reduction ratio by assembling a small number of gears, and the miniature reduction gear costs less because of the small number of parts.

Still further, the reduction mechanism has little noise because lower case 6 and upper case 26 are closed tightly, giving a miniature reduction gear that resists entry of dust.

FIG. 5 shows an example that makes the construction of the present invention still more effective. It has sliding mechanism or one-way clutch mechanism 51 between lower case 6 and fixed inner gear 10. The planetary gear reduction mechanism of the present invention creates a differential between the fixed inner gear and the movable inner gear by the solar rotation of the planetary gears, and the movable inner gear rotates relative to the stationary fixed inner gear. When a sliding mechanism is added between lower case 6 and fixed inner gear 10 and an overload is applied to output shaft 23, the sliding mechanism starts to slide at above a certain torque. Priorly, although reduction mechanisms for overload were used in miniature reduction gear and sliding mechanisms were used to prevent damage in other parts, with the present invention the sliding mechanism is added with almost no change in the outer shape.

FIG. 6(a) shows another sliding mechanism method where a space is furnished between lower case 6 and fixed inner gear 10, O-ring 52 is inserted, and a torque is made by a slight squeezing of the O-ring by lower case 6 and fixed inner gear 10. FIG. 6(b) shows a method of making torque by pressing fixed inner gear 10 with sheet spring 53.

Also, when the sliding mechanism is replaced with a one-way clutch mechanism, the miniature reduction gear is capable of producing rotation in only one direction on the output shaft.

Figure 7A:
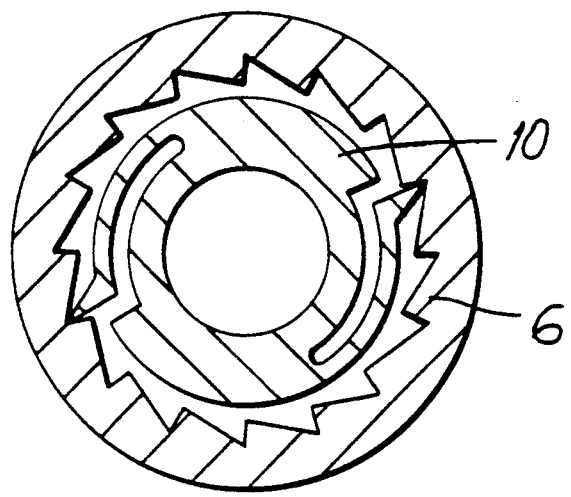
FIGS. 7(a), 7(b) are a representational drawings of a one-way clutch used in the other example of the present invention.
Figure 7B:
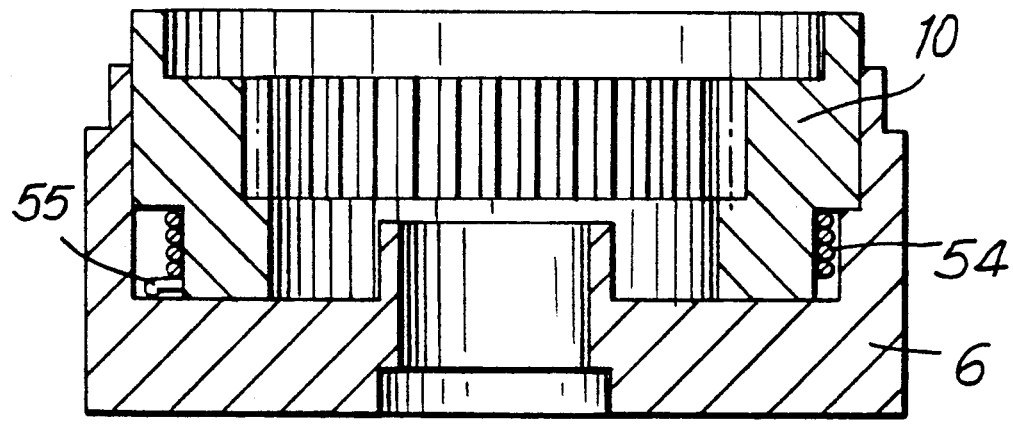
Figure 8:
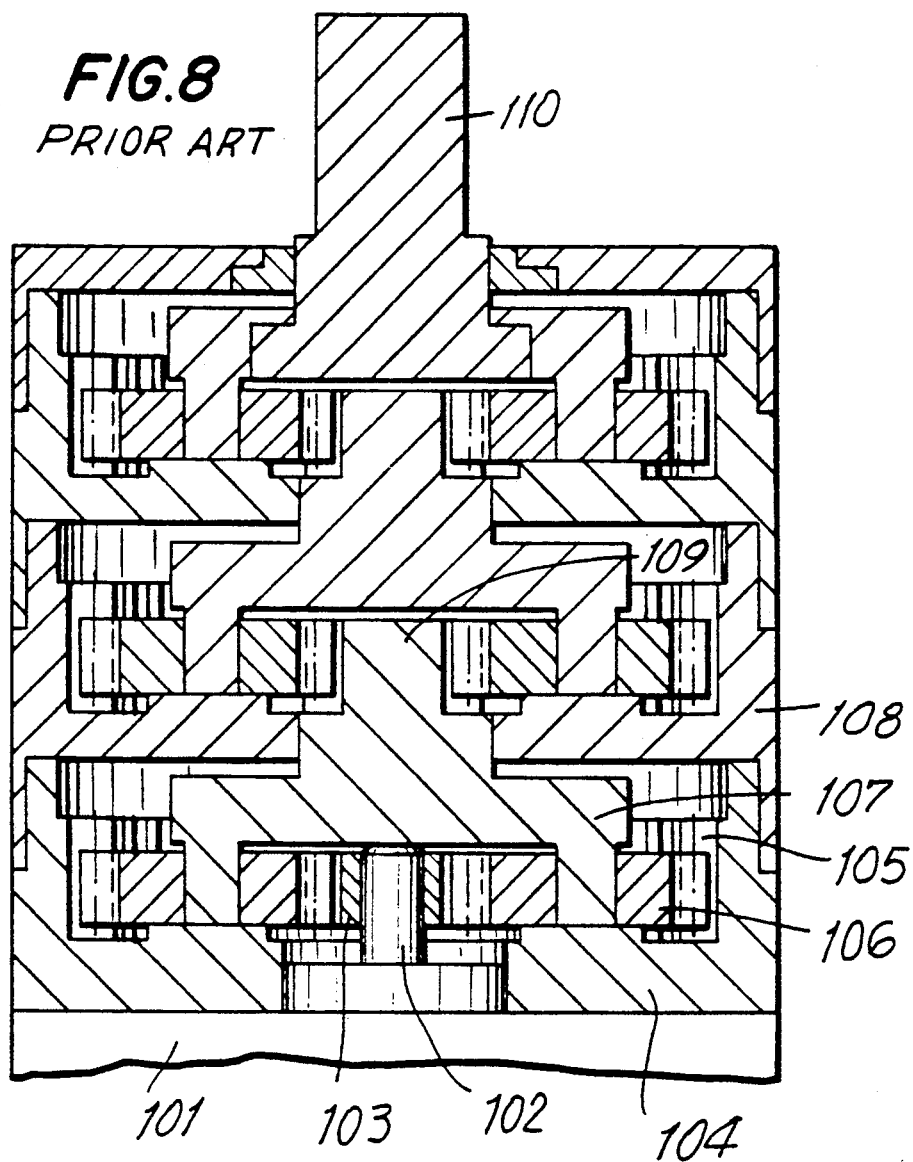
FIG. 8 is a sectional view showing a prior structure.
Figure 9:
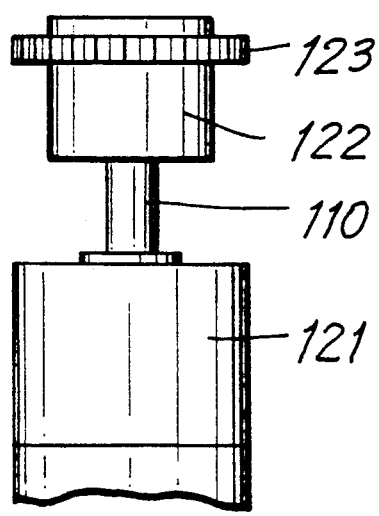
FIG. 9 is a drawing that shows another prior structure.

In regard to the one-way clutch mechanism, there is the ratchet mechanism method as shown in FIG. 7(a) and the spring clutch mechanism method as shown in FIG. 7(b). The ratchet mechanism utilizes the springiness of the plastic, and has a very low cost when formed in one body, as well as low noise.

Following this invention as described above offers a miniature reducing gear of low cost, giving high transmission efficiency, little backlash, little noise and superior dustproofing, giving a greater reduction ratio with fewer parts, and being sufficiently smaller than known miniature reduction gears of the same type.

Also, miniature reduction gears following the present invention and having sliding functions or one-way clutch functions have few parts, are sufficiently miniaturized and have low costs.

What is claimed is:

1. A miniature reduction gear comprising a sun gear with l teeth; a fixed inner gear with a m teeth and a movable inner gear having n teeth, said teeth being concentric with the said sun gear, and at least one planetary gear, said planetary gear being formed with an upper shaft and a lower shaft, said planetary gear having three sets of outer teeth thereon, a first set of outer teeth having t teeth engaging with the said sun gear, a second set of outer teeth having r outer teeth engaging with said fixed inner gear and a third set of outer teeth having s outer teeth engaging with said movable inner gear, in a manner that t>r and t>s, and forming a planetary gear mechanism with said sun gear producing an input and said movable inner gear produces output in response thereto, an output shaft a holder main body and holder caps that support the upper and lower shafts of said at least one planetary gear, said holder main body being concentric with said sun gear and supports said sun gear, said holder caps forming holder cap cradles concentrically formed with the output shaft and are supported so as to give support to a portion of said sun gear concentric with said holder cap.

2. The miniature reduction gear of claim 1 wherein said planetary gears include central shafts and tooth shape forming arms that exhibit a cross-shape when viewed in cross section, said planetary gear being formed with a closed hole provided as a blind hole in the longitudinal direction in said central shaft, and said first set of outer teeth being formed on said tooth shape forming arms and engaging said sun gear.

3. The miniature reduction gear of claim 2 wherein the average thickness of said planetary gear is 0.5 mm to 2 mm.

4. The miniature reduction gear of claim 1 further comprising an element whose inner surface is formed in the shape of a cylindrical vessel, the teeth of said movable inner gear being formed on the inner diametric surface of said element and engaging said planetary gear and the output shaft is formed on the central part of a closed surface side of the element so formed in the shape of a vessel.

5. The miniature reduction gear of claim 4 wherein said moveable inner gear is formed with an output shaft and an inset formed on the inside surface of said vessel shaped element is oriented with said output shaft.

6. The miniature reduction gear of claim 5 wherein said inset is a closed hole formed as a blind hole.

7. The miniature reduction gear of claim 6 wherein the average thickness of said vessel shaped element is 0.5 mm to 2 mm.

8. The miniature reduction gear of claim 5 wherein the average thickness of said vessel shaped element is 0.5 mm to 2 mm.

9. The miniature reduction gear of claim 2, wherein the housing includes an upper case and a lower case, and the upper case being attached by joining with a pawl emerging from either one of said upper case and said lower case.

10. The miniature reduction gear of claim 9 a portion of said housing that covers the planetary gear and a portion of said housing that covers said fixed internal gear are separate bodies.

11. The miniature reduction gear of claim 2 further comprising a holder wherein said sun gear, said at least one planetary gear, said fixed inner gear, the movable inner gear and said holder are formed of a polyamide type plastic containing filler or whiskers and lubricant.

12. The miniature reduction gear of claim 11 wherein said plastic contains 20% to 40% filler or whiskers and 5 to 20% lubricant.

13. A miniature reduction gear comprising a sun gear with l teeth; a fixed inner gear with m teeth and a movable inner gear having n teeth, said teeth being concentric with said sun gear, and at least one planetary gear, said planetary gear having three sets of outer teeth thereon, a first set of outer teeth having t teeth engaging with said sun gear, a second set of outer teeth having r outer teeth engaging with said fixed inner gear and a third set of outer teeth having s outer teeth engaging with said movable inner gear, in a manner that t>r and t>s, and forming a planetary gear mechanism with said sun gear producing an input and said movable inner gear producing an input in response thereto, a housing adapted to house at least said planetary gear mechanism, and a sliding mechanism disposed between said fixed inner gear and said housing; said planetary gears including central shafts and tooth shape forming arms that exhibit a cross-shape when viewed in cross section, said planetary gear being formed with a closed hole provided as a blind hole in the longitudinal direction in said central shaft, and said first set of outer teeth being formed on said tooth shape forming arms and engaging said sun gear.

14. A miniature reduction gear comprising a sun gear with l teeth; a fixed inner gear with m teeth and a movable inner gear having n teeth, said teeth being concentric with said sun gear, and at least one planetary gear, said planetary gear having three sets of outer teeth thereon, a first set of outer teeth having t teeth engaging with said sun gear, a second set of outer teeth having r outer teeth engaging with said fixed inner gear and a third set of outer teeth having s outer teeth engaging with said movable inner gear, in a manner that t>r and t>s, and forming a planetary gear mechanism with said sun gear producing an input and said movable inner gear producing an output in response thereto, a housing adapted to house at least said planetary gear mechanism and a sliding mechanism disposed between said fixed inner gear and said housing; said housing including an upper case and a lower case, and the upper case being attached by joining with a pawl emerging from either one of said upper case and said lower case.

15. A miniature reduction gear comprising a sun gear with l teeth; a fixed inner gear with m teeth and a movable inner gear having n teeth said teeth being concentric with the said sun gear, and at least one planetary gear, said planetary gear having three sets of outer teeth thereon, a first set of outer teeth having t teeth engaging with the said sun gear, a second set of outer teeth having r outer teeth engaging with said fixed inner gear and a third set of outer teeth having s outer teeth engaging with said movable inner gear, in a manner that t>r and t>s, and forming a planetary gear mechanism with said sun gear producing an input and said movable inner gear producing an output in response thereto; a housing adapted to house at least said planetary gear mechanism, the housing including an upper case and a lower case, and the upper case being attached by joining with a pawl emerging from either said lower case and said upper case, and a one-way clutch mechanism between said fixed inner gear and said housing.

* * * * *